(12) United States Patent
Benninger

(10) Patent No.: US 7,299,916 B2
(45) Date of Patent: Nov. 27, 2007

(54) TRANSFER MECHANISM AND METHOD OF USE

(75) Inventor: David Benninger, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 158 days.

(21) Appl. No.: 10/872,366

(22) Filed: Jun. 22, 2004

(65) Prior Publication Data

US 2005/0279615 A1 Dec. 22, 2005

(51) Int. Cl.
*B65G 13/07* (2006.01)

(52) U.S. Cl. ............... 198/790; 198/788; 193/35 R

(58) Field of Classification Search ........... 198/780, 198/781.01, 781.03, 782, 783, 787, 788, 198/789, 790, 832, 835, 781.09; 193/35 R
See application file for complete search history.

(56) References Cited

U.S. PATENT DOCUMENTS

| | | | | | |
|---|---|---|---|---|---|
| 2,883,172 | A | * | 4/1959 | Mitchell | 198/790 |
| 3,240,311 | A | * | 3/1966 | Hofer et al. | 198/790 |
| 3,513,960 | A | * | 5/1970 | Adams | 198/781.05 |
| 3,650,375 | A | * | 3/1972 | Fleischauer et al. | 198/790 |
| 3,724,643 | A | * | 4/1973 | Kohl | 198/787 |
| 3,826,351 | A | * | 7/1974 | Fromme | 198/787 |
| 3,902,589 | A | * | 9/1975 | Bylsma | 198/790 |
| 4,179,026 | A | * | 12/1979 | de Vries | 198/834 |
| 5,042,645 | A | * | 8/1991 | Pritchard | 198/782 |
| 5,244,081 | A | * | 9/1993 | Kajii et al. | 198/790 |
| 5,348,140 | A | * | 9/1994 | Clos | 198/790 |
| 5,377,817 | A | * | 1/1995 | Kohl | 198/781.03 |
| 5,586,639 | A | * | 12/1996 | Yoshino | 198/690.2 |
| 6,089,385 | A | * | 7/2000 | Nozawa | 193/35 R |
| 6,494,306 | B1 | * | 12/2002 | Hollander | 198/349.5 |
| 6,710,505 | B1 | * | 3/2004 | Barani et al. | 198/788 |
| 6,772,873 | B1 | * | 8/2004 | Coleman | 198/780 |
| 2004/0094384 | A1 | * | 5/2004 | Shaw et al. | 193/35 R |

* cited by examiner

*Primary Examiner*—James R. Bidwell
(74) *Attorney, Agent, or Firm*—Greenblum & Bernstein, P.L.C.

(57) ABSTRACT

A transporting device includes a power roller mounted to a chassis for transporting a tray between positions. A belt transfers power from the power roller to a shaft. The belt may be used to rotate the shaft. A pulley is mounted to the shaft and rotates in substantially synchronous motion with the shaft. The pulley may also be used to rotate a roller in a bin location for moving a tray from a staging area to a working area. A method is also provided for using the device.

26 Claims, 4 Drawing Sheets

TRANSFER MECHANISM AND METHOD OF USE

BACKGROUND OF THE INVENTION

1. Field of the Invention

The invention generally relates to a transfer mechanism and, more particularly, to a single power roller transfer system to transport trays and other objects.

2. Background Description

The sorting of mail is a very complex, time consuming task. In general, the sorting of mail is processed though many stages, including back end processes, which sort or sequence the mail in delivery order sequence. These processes can either be manual or automated, depending on the mail sorting facility, the type of mail to be sorted such as packages, flats, letters and the like. A host of other factors may also contribute to the automation of the mail sorting, from budgetary concerns to modernization initiatives to access to appropriate technologies to a host of other factors.

In general, however, most modern facilities have taken major steps toward automation by the implementation of a number of technologies. These technologies include, amongst others, letter sorters, parcel sorters, advanced tray conveyors, flat sorters and the like. As a result of these developments, postal facilities have become quite automated over the years, considerably reducing overhead costs.

At the back end of the sorting or sequencing process, mail trays are placed within bin locations for the placement of letters and the like. For example, during the sorting of mail pieces such as flats (e.g., magazines, newspapers and the like), each of the mail pieces for a particular delivery route and more specifically a segment of a delivery route is inducted into a specific pre-allocated bin location. In the bin location, a tray is provided for storing of the mail piece prior to delivery. In a typical system, the tray is capable of holding between 65 and 85 flats, depending on the size of the flats.

These trays, once filled, are then physically removed and replaced in the bin locations. This may be performed in a manual process. In the manual, the trays are placed on inclined tray racks within the bin location. The tray racks include idler rollers which may gravity feed the trays to the working location. Final transfer onto a conveyor take-away system for delivery, warehousing or further sequencing, packaging or the like is accomplished manually.

By way of a more specific example, to gravity feed the trays, two trays are initially placed on each of the inclined tray racks at each bin location. These trays are placed, for example, in the working area and the staging area. Upon filling the bin in the working area, an operator would transfer the working tray onto the conveyor take-away system. At this time, the tray in the staging area will be fed, via gravity, to the working area.

But during either the manual or the semi-automated gravity method, there may be a delay in placing a new tray at the working area of the bin location. For example, in some instances, the tray will remain within the staging area, never reaching the working area. In this instance, the operator will need to initially move the tray to begin the gravity feed. In such situations where there is a delay in the movement of the tray into the working area or, in the alternative, no tray ever reaches the working area, several illustrative problems may result:

(i) the bin location may have to be disabled so to avoid mail spillage; or (ii) there may be a resultant mail jam resulting from mail spillage or other user induced incidence resulting from the swap.

In any of these situations, the potential for impacting the ability to sort mail pieces properly is greatly increased. In other words, the efficiency of the system can be greatly reduced during this swap process.

The invention is directed to overcoming one or more of the problems as set forth above.

SUMMARY OF THE INVENTION

In a first aspect of the invention, a transporting device includes a power roller mounted to a chassis for transporting a tray between positions. A belt transfers power between the power roller and a shaft. Thus, the belt is used to rotate the shaft. A pulley is mounted to the shaft and rotates in substantially synchronous motion with the shaft.

In another aspect of the invention, a system of transporting trays includes a bin location having a plurality of rollers for transporting a tray from at least a staging area to a working area. A transport mechanism is located within the bin location and in proximity to the take-away conveyor. The transport mechanism includes a power roller mounted to a chassis for transporting trays within the bin location and to the take-away conveyor. A lift belt rotates a shaft upon activation of the power roller. A pulley is also mounted to the shaft and rotates with a rotation of the shaft. A belt extends between the pulley and at least one of the plurality of rollers in the staging area. The belt rotates at least one of the rollers in the staging area upon rotation of the pulley and power roller. The rotation of the rollers will move the staged tray into or substantially into the working area.

In another aspect of the invention, a method of transporting trays comprises filling a tray in a working area and determining a time to move the tray in the working area. The method further includes activating a roller system to move the tray to a conveyor area and to move another tray from a staging area to the working area.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF EMBODIMENTS OF THE INVENTION

The invention is directed to, for example, a transport mechanism for transporting trays and other types of containers and objects (referred generally as "trays") from a bin location to a take-away conveyor. The transport mechanism may also transport trays within the bin location, itself, from a staging area to a working area. The transport mechanism is, in one embodiment, a modular system adapted to be fitted to any number of systems such as the mail or flat sorting and sequencing systems manufactured by Lockheed Martin Corporation. The transport mechanism, however, can be used in a host of other applications such as warehousing and storage applications all contemplated for use with the invention. In one aspect of the invention and as discussed in more detail below, the transport mechanism is designed to ensure proper incremental movement of the trays without any manual intervention, thus reducing labor and processing costs, as well as increasing efficiency of any associated system.

SYSTEM OF THE INVENTION

Figure 1:
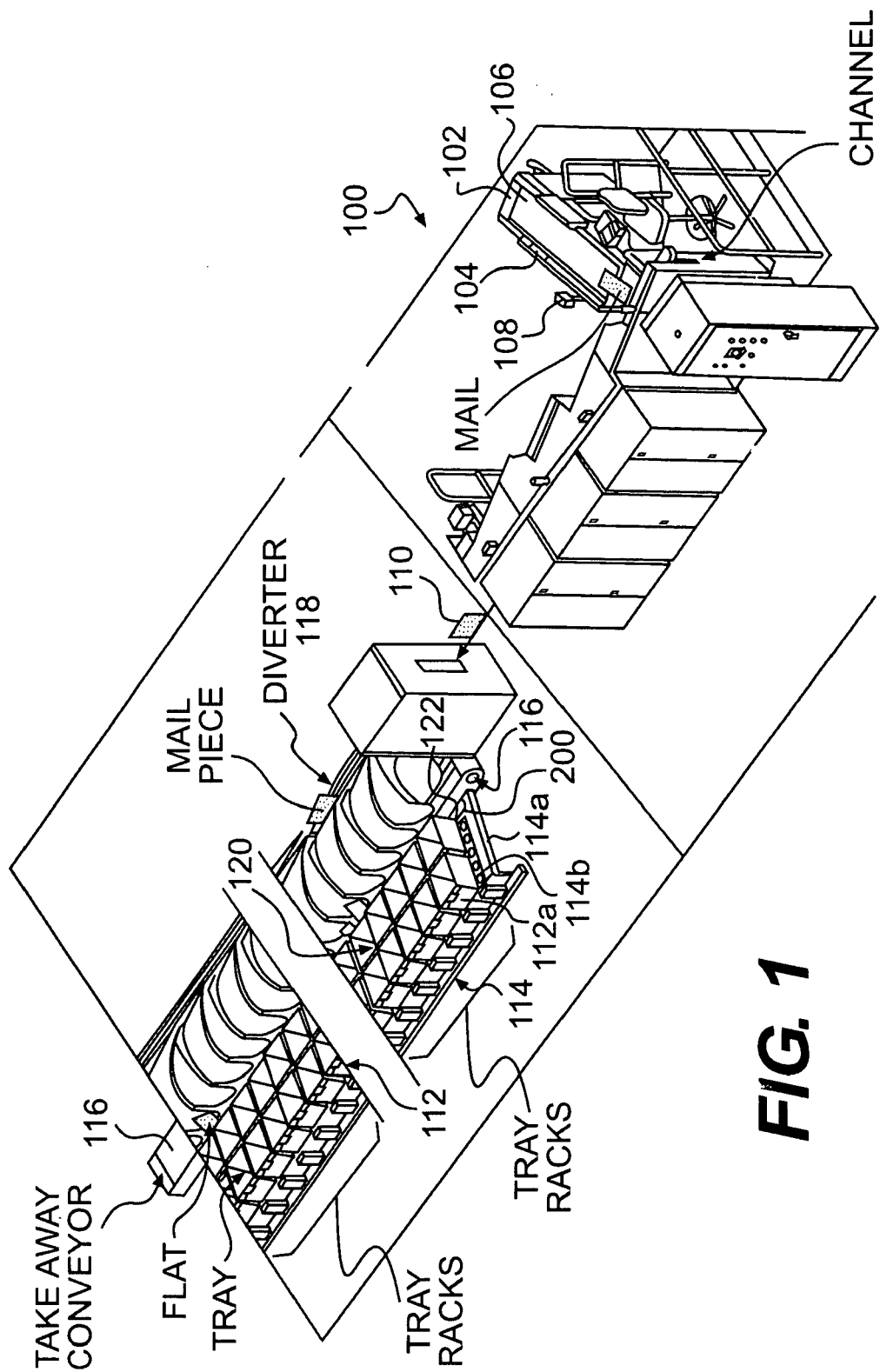
FIG. 1 shows a schematic diagram of an illustrative sorting and/or sequencing device used with the invention.

FIG. 1 shows a schematic diagram of a sorting system used with the invention. The sorting system of FIG. 1 is provided as one illustrative example of a system used with the invention. It should thus be understood, as discussed above, that the transport mechanism may be used with other systems and that which is shown in FIG. 1 should not be considered to be a limiting feature of the invention.

In the embodiment of FIG. 1, the sorting system is generally depicted as reference numeral 100 and includes at least one feeder 102. In embodiments, one feeder 102 is a manual flat feeder station. However, it should be understood by those of skill in the art that the feeder may equally be a letter feeder, parcel feeder or several manual or automated feeders of any type, in any combination with feeding capacity rates known to those of skill in the art.

The feeder 102 may include a scanning device 104 such as, for example, an optical character recognition device (OCR), bar code scanner or the like provided adjacent or proximate a feed track 106 or on the feeder 102. The OCR 104 communicates with a controller 108 via an Ethernet, Local Area Network, Wide Area Network, Intranet, Internet or the like. In one particular application, for illustration, the OCR 104 will capture information such as, for example, address destination information, from the flats (e.g., known generally as mail pieces). Once the information is captured, it will be sent to the central processing unit (e.g., controller 108) for interpretation and analysis, e.g., to determine sorting and sequencing patterns of the mail pieces. Using this information, the controller 108 can provide instructions to any of the components of the invention for sorting or sequencing of the mail pieces.

In use, the feeder 102 is designed to deposit mail pieces represented generally as reference numeral 110 for transport to holding trays 112 positioned at respective bin locations 114. In one embodiment, any number of physical bin locations are provided on the system; however, in one implementation 100 physical bin locations are used with the system. It should be recognized, through, that it is contemplated that the system may have any number, "n", of physical bin locations.

As further seen in FIG. 1, the bin locations 114 are adjacent to a take-away conveyor 116 and a diverter mechanism 118. Through control of controller 108, the diverter mechanism 118 will divert mail pieces to the appropriate bin locations, depending on the particular sort or sequencing pattern. This may be accomplished using any well known technique such as a two-pass sort algorithm or a single-pass sort algorithm technique for sorting and sequencing of objects. As the diverter mechanism 118 diverts the mail pieces towards the bin locations, they will fall within one of the trays 112 within the respective bin location 114, in an ordered manner.

The bin locations 114 include rails 114a, each accommodating a plurality of conveyors or rollers 114b. The trays 112 rest on the rollers 114b, which are used to transport a staging tray 112a toward a filling or working area, generally represented as reference numeral 120. The working area 120 is adjacent the system 100 and more particularly the take-away conveyor 116. A transport mechanism 200 is provided in the working area 120 and is, in one aspect of the invention, designed to be placed under a tray within the working area 120 between the rails of the bin locations.

The transport mechanism 120 is a modular system and is designed, amongst other features and functions, to interface with the plurality of the rollers 114b, preferably in the staging area. The transport mechanism 200 is further designed to interact with a bottom surface of the trays in the working area to facilitate transportation or induction onto the take-away conveyor 116 upon filling of the tray. That is, the transport mechanism 200 is design to inject a tray onto the take-away conveyor 116.

In one implementation, a sensor 122 may be positioned near the working area to control the functionality of the transport mechanism 200. This sensor 122 may be a diffuse sensor which will activate and deactivate the transport mechanism 200 upon triggering events. For example, when a tray interferes with a beam or beams emitted from the sensor 122, the transport mechanism will be deactivated. On the other hand, however, when a tray is not blocking the beam or beams, the transport mechanism will be activated and thus provide a means for moving the trays within the bin locations, as well as inducting trays onto the take-away conveyor 116 (as discussed in more detail below). It should further be understood, though, that other sensors such as a weight sensor or other photodiode may also be implemented in the system to determine, for example, when a tray is full or other system status to initially activate the transport mechanism, at the appropriate times.

Figure 2:
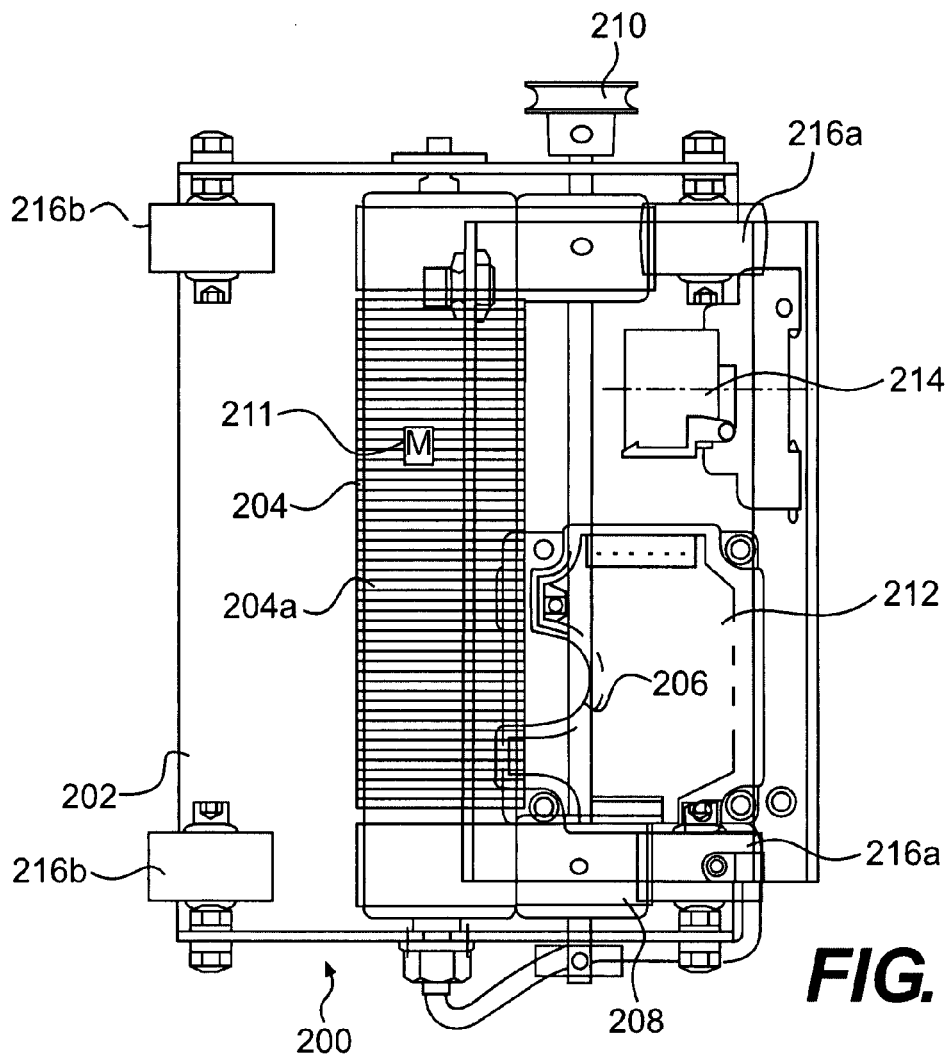
FIG. 2 is a top view of the transport mechanism in accordance with an embodiment of the invention.

FIG. 2 shows a top view of the transport mechanism in accordance with one aspect of the invention. The transport mechanism 200 includes a modular chassis 202 capable of being mounted within the bin locations. A power roller 204 is mounted to the chassis and includes a friction surface 204a to ensure adequate gripping contact with the underside of the tray and thus ensure proper induction onto the take-away conveyor 116. In one embodiment, the friction surface 204a also is capable of maintaining the tray in a desired location during the filling process. The power roller 204, which houses a self-contained low-energy motor 211, will substantially traverse the bottom surface of a standard mail handling tray currently used, for example, by the Unites States Postal System. The direction of rotation of the power roller 204 will be in the direction of the take-away conveyor, preferably.

The transport mechanism 200 further includes a rotating shaft 206. The shaft 206 is coupled to the power roller 204 via a belt or belts 208. The belt 208 is preferably a flat belt, in one implementation, and is designed to initially lift the tray to the level of the power roller 204. A power take off pulley 210 is mounted to the shaft 206, outside of the chassis. In one implementation, the power take off pulley 210 is designed to align with the plurality of rollers 114b of the bin locations in at least the staging area and rotate in substantially synchrony with the shaft 206. This alignment may be on either side of the bin location; that is, the power take off pulley 210 may be located on either side of the chassis, without impairing its functionality.

The power take off pulley 210 will be powered by the power roller 204 via the belt connection to the shaft 206. A controller 212 and power relay 214 are also mounted to the chassis 202. Additionally, a plurality of rollers 216a, 216b may be mounted to the chassis to further facilitate movement of the tray onto the transport mechanism and subsequent induction onto the take-away conveyor 116.

Figure 3:
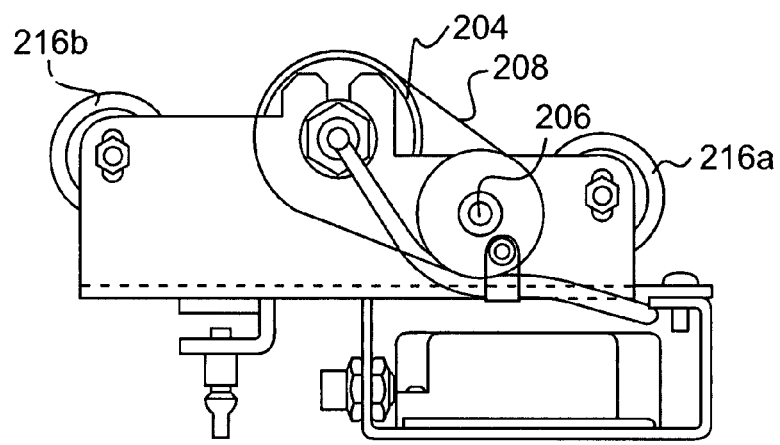
FIG. 3 is a side view of the transport mechanism in accordance with an embodiment of the invention.

FIG. 3 is a side view of the transport mechanism of the invention. As seen more clearly in this view, in one embodiment, the power roller 204 is at a raised or elevated level compared to the shaft 206, for example. The belt 208 spans the two levels between the power roller 204 and the shaft 208, and will assist in raising a tray from one level to the next, upper level. In one aspect of the invention, the roller 216a is designed to be at the lower level, an approximate same level as the rollers 114b. The rollers 216a and power roller 204 may be at a level to maintain and facilitate placement of objects into the trays. That is, in one embodiment, the level of the power roller 204 may be used to hold the tray in position in the working area. The rollers 216b and power roller 204, on the other hand, may be at a level to facilitate smooth transfer of the trays onto the take-away conveyor.

Figure 4:
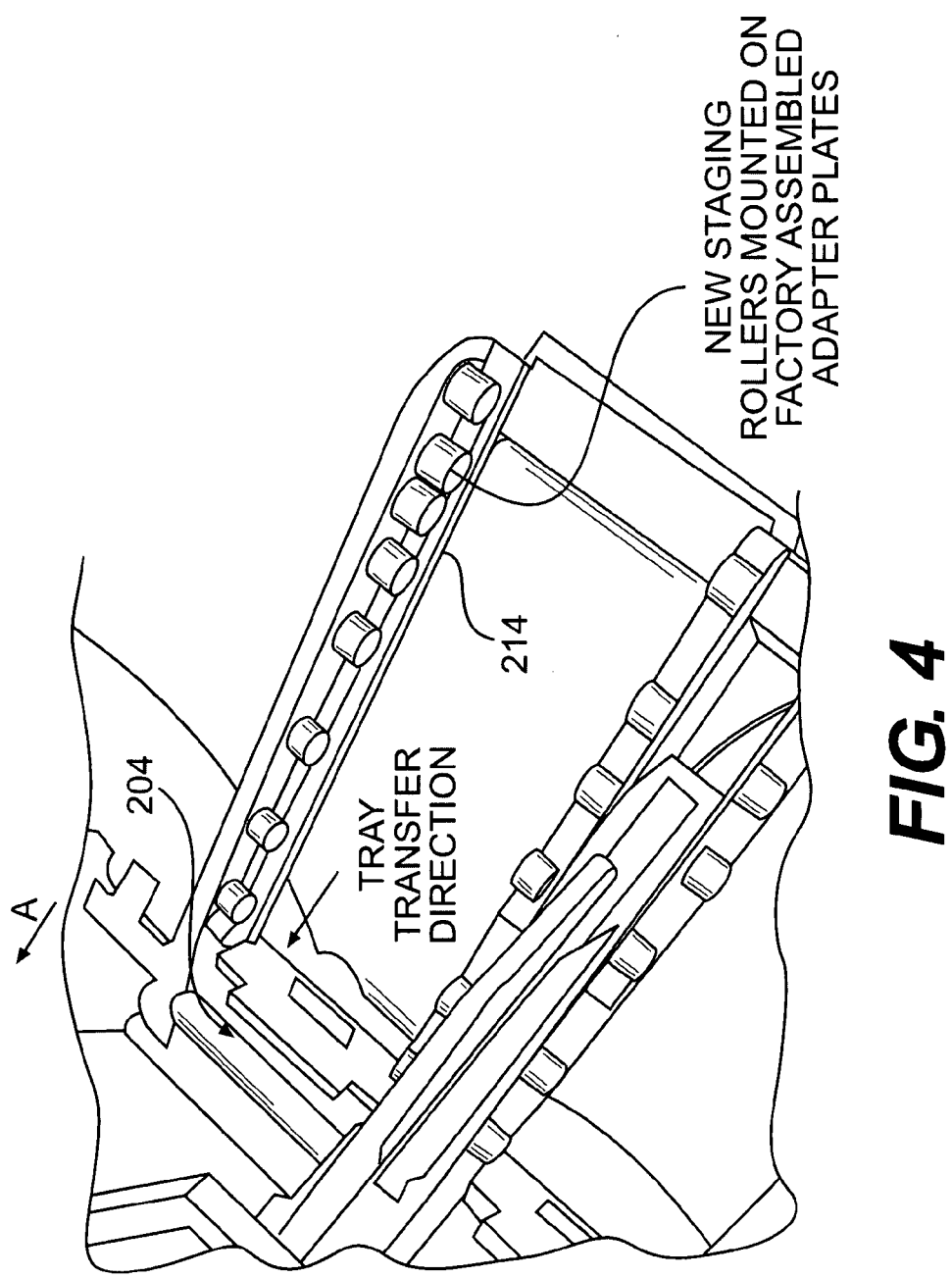
FIG. 4 is a top view of the transport mechanism in a bin location in accordance with the invention.

FIG. 4 shows a top view of the transport mechanism 200 within a bin location. In this implementation, the power roller 204 is shown with a gripping surface 204a, intermittently placed on the power roller 204, itself. The chassis 202 is also shown to be placed within the rails 114a of the bin locations. Since the transport mechanism 200 is a modular system, it is easily adapted to fit within any system.

A belt drive 214 is wound around the power take off pulley 210 and rollers 114b near the staging area. Upon energizing the transport mechanism, the power roller 204 will begin to rotate in the direction of arrow "A". This will, in turn, rotate the shaft 206 via the belt 208. The power take off pulley 210 will also then rotate, which will drive the belt drive 214. In turn, the belt drive 214 will rotate the rollers 114b. The rotation of the rollers 114b, in the staging area, will move the tray to the working area, near the transport mechanism 200. The trays may also move, partly, under the force of gravity when the rails are raised slightly in the staging area, compared to the working area.

EXAMPLE OF USE

Figure 5:
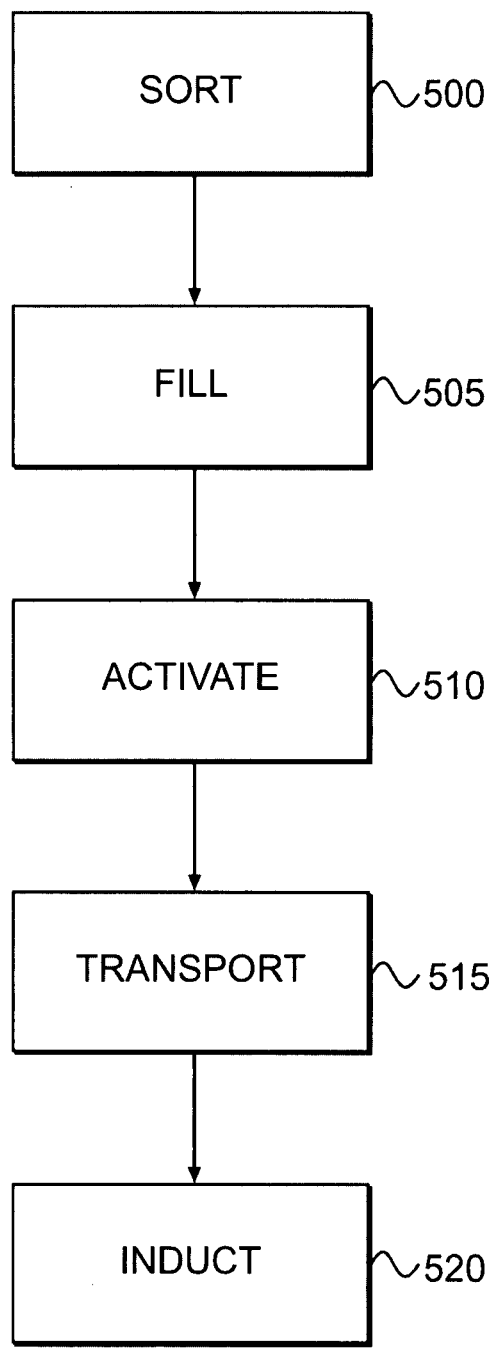
FIG. 5 is a flow diagram showing steps in accordance with a method of the invention.

FIG. 5 is a flow chart implementing the steps of the invention as described above. The steps of the invention may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation or the sort computer over the Internet or some other type of network. FIG. 5 may equally represent a high-level block diagram of the system of the invention, implementing the steps thereof.

At step 500, the system maintains track of the delivery routes of the mail pieces by having the OCR read the mail information, sending this mail information to the controller 108 which, in turn, processes the information to determine the appropriate sort location. At step 505, the tray in the working area begins to fill, while being monitored by a sensor to determine when it is full. At step 510, when the tray is full or the sorting process for this bin location is complete for this tray, the transfer mechanism will activate. In other words, the power roller 204 and power take off pulley 210 will begin to rotate. During this process, the tray in the working area will be injected or inducted onto the take-away conveyor 116 and the rollers in the staging area will begin to rotate, which will move the staged tray towards the transport mechanism. At step 515, the staged tray will move forward along the rollers 114b and then contact the lift belt of the transport mechanism 200, at which time the staged tray transportation into position in the working area will be complete. A sensor will sense the tray in the proper location and shut down the transport mechanism. At step 520, the mail objects will begin to be inducted into the new tray. This process can continue until the sorting and/or sequencing operation is complete.

By using the system and method of the invention, the footprint, safety perimeter and many of the features of an existing system remain the same. Also, the machine access is unencumbered. Additionally, the tray output rack system modularity is maintained by using connectors for all wiring, and there is no requirement of additional pneumatic requirements and only minimal additional electrical requirements. Additionally, due to the modular nature of the invention, there is easy installation with no requirement to modify existing systems. The modality also accommodates Plug-N-Play cable design and field retrofitable with minimal disruption to site operations.

While the invention has been described in terms of embodiments, those skilled in the art will recognize that the invention can be practiced with modification within the spirit and scope of the appended claims.

I claim:

1. A modular transporting device, comprising:
   a power roller mounted to a chassis for transporting a tray between positions;
   the chassis being a modular chassis that is structured and arranged to be mounted within a working area;
   a shaft;
   a belt arranged within the chassis and transferring power from the power roller to an end portion of the shaft whereby the belt rotates the shaft; and
   a pulley mounted to a different end portion of the shaft and rotating in substantially synchronous motion with the shaft,
   wherein the modular transporting device utilizes a Plug-N-Play cable design.

2. The device of claim 1, further comprising a plurality of conveyor rollers rotatable via another belt wound between the pulley and at least one of the conveyor rollers.

3. The device of claim 1, wherein some of the plurality of conveyor rollers are positioned about the power roller.

4. The device of claim 1, wherein the plurality of conveyor rollers are mounted to the chassis.

5. The device of claim 1, wherein the power roller includes a friction surface thereon.

6. The device of claim 1, wherein the pulley is mounted outside confines of the chassis.

7. The device of claim 1, wherein the pulley is adapted to align with conveyor rollers remote from the chassis.

8. The device of claim 1, further comprising a position sensor proximate to the power roller to determine the presence or absence of the tray and, in combination with a controller, activating or deactivating the power roller.

9. The device of claim 1, wherein the pulley is a power take off pulley.

10. The device of claim 1, wherein, in an area of engagement with the belt, the power roller has a larger diameter than the shaft.

11. The device of claim 1, wherein the power roller constitutes one and only one power roller.

12. The device of claim 2, wherein each of the plurality of conveyor rollers is mounted to the chassis via a slot.

13. The device of claim 1, wherein the power roller houses a motor.

14. The device of claim 1, wherein the pulley is arranged outside of the chassis.

15. The device of claim 1, further comprising a controller mounted to the chassis.

16. The device of claim 15, further comprising a power relay mounted to the chassis.

17. The device of claim 1, wherein the modular transporting device is structured and arranged to be fitted to a number of mail systems, flat sorting systems, or sequencing systems.

18. The device of claim 1, further comprising:
a controller mounted to the chassis; and
a motor arranged between side walls of the chassis.

19. The device of claim 18, wherein the modular transporting device is structured and arranged to be fitted to a number of mail systems, flat sorting systems, or sequencing systems.

20. The device of claim 18, further comprising a power relay mounted to the chassis.

21. The device of claim 1, further comprising:
a controller mounted to the chassis; and
a motor arranged within the power roller.

22. The device of claim 21, wherein the modular transporting device is structured and arranged to be fitted to a number of mail systems, flat sorting systems, or sequencing systems.

23. The device of claim 21, further comprising a power relay mounted to the chassis.

24. A transporting device, comprising:
a power roller mounted to a chassis for transporting a tray between positions;
a shaft;
a belt transferring power from the power roller to the shaft and which rotates the shaft; and
a pulley mounted to the shaft and rotating in substantially synchronous motion with the shaft,
wherein the belt is a lift belt and the power roller is at an elevated level with respect to the shaft.

25. A transporting device, comprising:
a power roller mounted to a chassis for transporting a tray between positions;
a shaft;
a belt transferring power from the power roller to the shaft and which rotates the shaft;
a pulley mounted to the shaft and rotating in substantially synchronous motion with the shaft; and
a plurality of rollers mounted to the chassis,
wherein the power roller is at an elevated level with respect to the shaft and at least one of the plurality of rollers is at the elevated level and at least another of the plurality of rollers is at a lower level.

26. The device of claim 25, wherein the belt is a lift belt extending between the elevated level and the shaft.

* * * * *